Patented Aug. 30, 1949

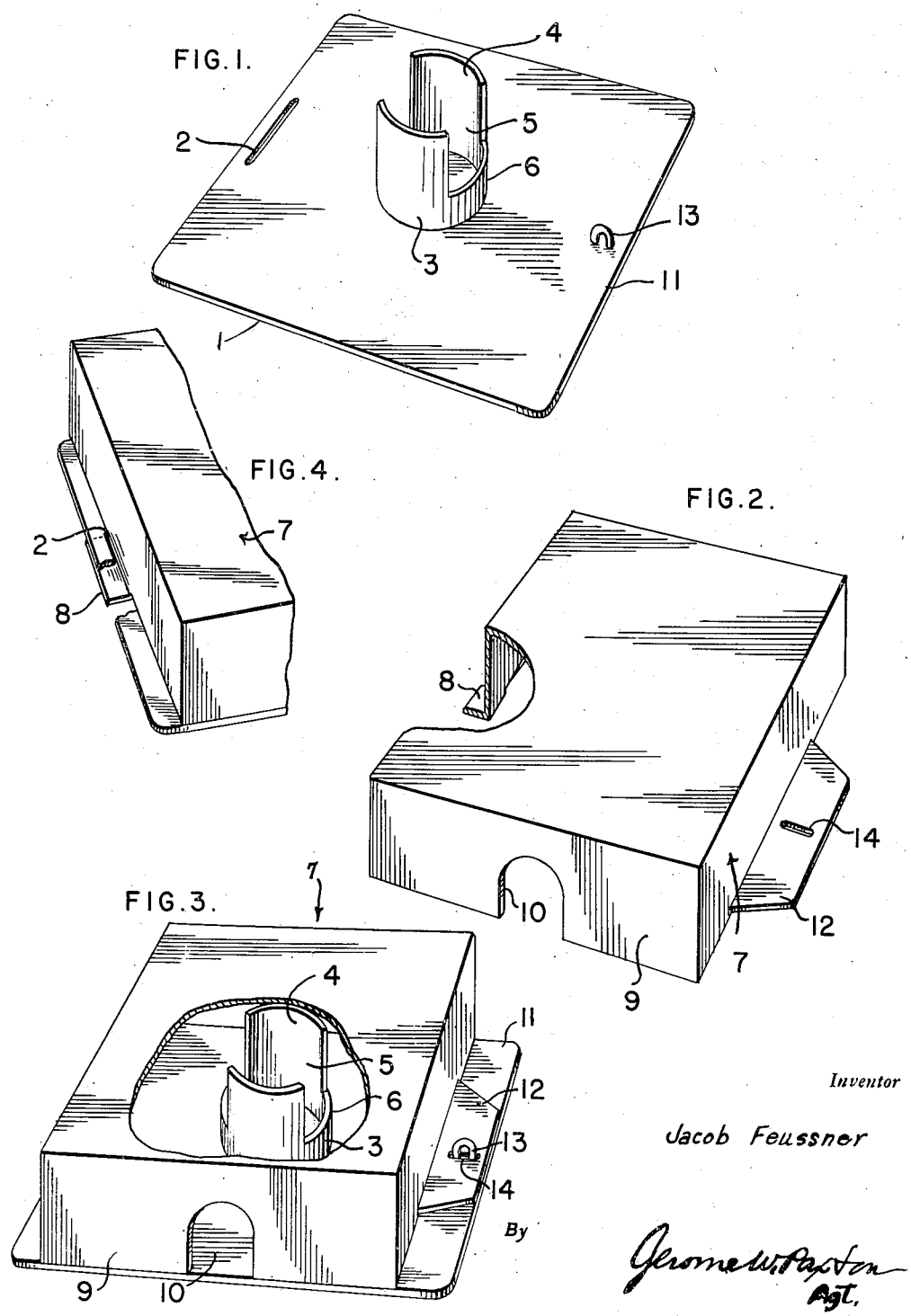

2,480,724

UNITED STATES PATENT OFFICE 2,480,724

RAT OR RODENT POISON HOLDER

Jacob Feussner, Freeland, Pa.

Application January 2, 1946, Serial No. 638,633

1 Claim. (Cl. 43—131)

This invention relates to holders for poisoned material or food such as is to be used for poisoning vermin such as rats and mice, and it is an object of the invention to guard the poisoned preparation against its being distributed or scattered in places where domestic animals might find and eat it.

It is a further object of this invention to provide a holder for the poison bearing material housed so that it will be guarded from access to other than those small animals such as rats, mice and weasels; means being provided by which the animals to be destroyed may enter and leave the guarded poison, whereas larger animals will not be able to gain access thereto.

It is furthermore an object to provide a holder for the poison which is enclosed except for small openings through which the contents of the holder are accessible, the arrangement being such that there is no likelihood of the contents of the holder escaping from the guarded structure.

It is a still further object of the invention to provide a holder of the character indicated comprising comparatively few, inexpensive, parts which are joined together for ready separation and by means which insure an effective joint between the separable parts when the trap is set.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a perspective view of the base, showing a bait holder thereon;

Figure 2 illustrates a perspective view of a cover to be detachably associated with the base;

Figure 3 illustrates the parts assembled; and

Figure 4 illustrates a fragment of the bait holder showing the joint between the base and cover.

In these drawings 1 denotes a base plate having a slot 2 near one edge and a bait-holding cup 3, which is preferably secured to the base by solder or autogenous welding. The flange or side portion 4 of the cup is provided with opposed openings, such as 5, in two sides, and the said openings preferably do not extend to the bottom of the cup. Hence, there is a retaining ring, as at 6, which prevents the poisoned material from being scattered or displaced from the cup. The openings are preferably disposed at opposite sides of the cup, as compared with openings in the cover, to be hereinafter described.

In the present embodiment of the invention, the contents of the cup are guarded by a housing 7 having a tongue 8 at one edge which is insertable in the slot 2 when the housing is applied to the base, and the said housing has sides 9 with openings 10 therein, through which access to the interior of the housing is gained, and these openings are in the sides of the housing at right angles to the positions of the openings 5 of the cups. The base is larger than the housing so that there is a projecting portion 11 of the base extending beyond the housing, and the housing has a flange or extension 12 which overlies the extension 11 of the base. It is the purpose of the inventor to provide means for attaching the parts 11 and 12 together so that they cannot be accidentally displaced, one from the other, and hence, a staple 13 is anchored to the extension 11 and it enters a slot 14 in the flange 12 so that a lock or other mechanical means may be run through the staple and appropriately anchored in order that the poison holder is prevented from being moved or interfered with by large animals that might scent the bait and endeavor to overturn or otherwise disturb it.

It is seen that the bait holder comprises comparatively few, inexpensive parts and when the housing is applied to the base, it covers the top of the cup and access to the bait may be had only through the openings 5 in the cup.

I claim:

A poison bait holder comprising a flat base of rectangular shape, a poison holding member secured to the base and having diametrically opposite projections providing diametrically opposite openings, a rectangular housing for the base having openings in two opposite walls thereof in alinement with the projections of the poison holding member, and securing means adjacent to corresponding edges of the housing and base and opposite the openings in the poison holding member when the housing is positioned on the base.

JACOB FEUSSNER.

REFERENCES CITED

The following references are of record in the file of this patent:

UNITED STATES PATENTS

| Number | Name | Date |
|---|---|---|
| 225,624 | McClain | Mar. 16, 1880 |
| 946,706 | Richards | Jan. 18, 1910 |
| 1,321,360 | Bright | Nov. 11, 1919 |